United States Patent
Uchikawa et al.

(10) Patent No.: US 8,447,363 B2
(45) Date of Patent: May 21, 2013

(54) MOBILE PHONE TERMINAL, IMAGE DISPLAY CONTROL METHOD, PROGRAM THEREOF AND PROGRAM RECORDING MEDIUM

(75) Inventors: Tatsuya Uchikawa, Tokyo (JP); Satoshi Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 857 days.

(21) Appl. No.: 12/532,180

(22) PCT Filed: Mar. 25, 2008

(86) PCT No.: PCT/JP2008/055479
§ 371 (c)(1),
(2), (4) Date: Sep. 21, 2009

(87) PCT Pub. No.: WO2008/117784
PCT Pub. Date: Oct. 2, 2008

(65) Prior Publication Data
US 2010/0120471 A1    May 13, 2010

(30) Foreign Application Priority Data

Mar. 26, 2007  (JP) .................................. 2007-078271
Oct. 24, 2007  (JP) .................................. 2007-276133

(51) Int. Cl.
*H04M 1/00*   (2006.01)
*G09G 3/32*   (2006.01)
*G09G 5/00*   (2006.01)

(52) U.S. Cl.
USPC ....... 455/566; 455/567; 455/575.1; 455/90.1; 345/82; 345/212

(58) Field of Classification Search
USPC .................... 455/566, 567, 550.1, 575.1
See application file for complete search history.

(56) References Cited

U.S. PATENT DOCUMENTS 7,561,127 B2 * 7/2009 Mori et al. ...................... 345/82
7,659,880 B2 * 2/2010 Miyazawa ..................... 345/102
(Continued)

FOREIGN PATENT DOCUMENTS

EP  1489853 A  12/2004
JP  8-278486 A  10/1996
(Continued)

OTHER PUBLICATIONS

Supplementary European Search Report for EP 08 72 2745 mailed Mar. 1, 2010.

(Continued)

*Primary Examiner* — Tilahun B Gesesse (57) ABSTRACT

Luminance levels of a backlight 3 corresponding to gradations of a display image are registered as reference luminance values to a table 5a, signal levels of a drive signal to an LED driver 4 corresponding to reference luminance values are registered as luminance setting values to a table 6a, and values to correct a drive level of a liquid-crystal panel corresponding to gradations of the display image are registered as gamma correction values to a table 7a. According to the gradation of an image to be displayed, a signal level of the drive signal corresponding to the reference luminance value attained from the table 5a is obtained from the table 6a, to thereby drive the LED driver 4; and an LCD driver 2 is driven by a value obtained through correction by the gamma correction value obtained from the table 7a, to thereby display an image.

18 Claims, 2 Drawing Sheets

U.S. PATENT DOCUMENTS

| | | | |
|---|---|---|---|
| 2004/0113906 A1* | 6/2004 | Lew et al. | 345/211 |
| 2005/0017994 A1 | 1/2005 | Oh | |
| 2005/0113864 A1* | 5/2005 | Gandhi et al. | 606/200 |
| 2005/0202851 A1* | 9/2005 | Yamamoto et al. | 455/566 |
| 2006/0221260 A1 | 10/2006 | Fujine | |
| 2006/0262111 A1 | 11/2006 | Kerofsky | |
| 2007/0285414 A1* | 12/2007 | Lee et al. | 345/212 |
| 2009/0170564 A1* | 7/2009 | Mori et al. | 455/566 |
| 2009/0295945 A1* | 12/2009 | Watanabe et al. | 348/231.99 |
| 2009/0304279 A1* | 12/2009 | Mori | 382/169 |
| 2010/0016028 A1* | 1/2010 | Takenaka et al. | 455/566 |
| 2010/0120471 A1* | 5/2010 | Uchikawa et al. | 455/566 |
| 2011/0111809 A1* | 5/2011 | Matsuo et al. | 455/566 |

FOREIGN PATENT DOCUMENTS

| | | |
|---|---|---|
| JP | 2001-154642 A | 6/2001 |
| JP | 2002-366103 A | 12/2002 |
| JP | 2004004372 A | 1/2004 |
| JP | 2004-126470 A | 4/2004 |
| JP | 2004-240293 A | 8/2004 |
| JP | 2005043894 A | 2/2005 |
| JP | 2005049631 A | 2/2005 |
| JP | 2005274831 A | 10/2005 |
| JP | 2007-248838 A | 9/2007 |
| WO | 2007/029420 A | 3/2007 |

OTHER PUBLICATIONS

N. Chang, et al., "DLS: Dynamic Backlight Luminance Scaling of Liquid Crystal Display", IEEE Transactions on Very Large Scale Integration (VLSI) Systems, vol. 12, No. 8, Aug. 2004, pp. 837-846.

Japanese Office Action for JP2009-506335 mailed on Jun. 5, 2012.

\* cited by examiner

MOBILE PHONE TERMINAL, IMAGE DISPLAY CONTROL METHOD, PROGRAM THEREOF AND PROGRAM RECORDING MEDIUM

TECHNICAL FIELD

The present invention relates to a mobile phone terminal, an image display control method, an image display control program, and a program recording medium, and in particular, to a mobile phone terminal, an image display control method, an image display control program, and a program recording medium in which consumed power can be reduced while retaining display quality.

RELATED ART

For mobile phone terminals, service functions thereof are steadily increasing not only for the call but also for mail, photographing by a camera, browsing, TV, and the like; additionally, display images to be presented on mobile phone terminals are diversified; as a need of users for the display function of mobile phone terminals, it has been required to display images with higher quality.

On the other hand, due to diversification of the service functions, it is required that mobile phone terminals can be used for a further elongated period of time; reduction in the consumed power of mobile phone terminals is an essential issue for the differentiation between the competing makers. Particularly, the consumed power of the liquid-crystal backlight takes quite a large portion of the overall consumed power of the mobile phone terminal; hence, reduction in the consumed power of the liquid-crystal backlight is quite advantageous. Patent Document 1, i.e., Japanese Patent Laid-Open Pub. No. 2004-126470 proposes a technique in which on/off control of the display backlight is performed according to a displayed image.

Patent Document 1: Japanese Patent Laid-Open Pub. No. 2004-126470 (pages 6 to 8)

DISCLOSURE OF THE INVENTION

Problem to be Solved by the Invention

However, in the conventional on/off control of the backlight of the mobile phone terminal as in Patent Document 1 described above, the gradation is checked for each color of the displayed image, and only the control is performed to turn the backlight off when the gradation value is substantially zero; in a state where the gradation value is not in the vicinity of zero, the backlight is kept turned on with the luminance unchanged; this leads to a problem of insufficient reduction effect of the consumed power.

Further, for the luminance value itself of the backlight of the conventional mobile phone terminal, there is employed a backlight luminance value set in advance and the luminance value is not controlled according to the gradation of the display image; hence, to further reduce the consumed power, there has been prepared only means to beforehand set the backlight luminance value to a lower value regardless of the display image gradation, which exerts influence upon visibility of the display image.

Moreover, the technique in which an illuminance sensor is employed to perform the backlight luminance control according to an environment in the periphery of the mobile phone terminal (intensity of external light incident to the mobile phone terminal) is also limited to a particular environment; there does not exist a technique which provides a fully satisfying advantage of lowering the consumed power also under any environmental condition.

The present invention has been devised in consideration of the above situation and aims at providing a mobile phone terminal, an image display control method, an image display control program, and a program recording medium in which backlight luminance control and gamma characteristic control of a Liquid-Crystal Display (LCD) is conducted according to an image to be displayed, to thereby reduce the consumed power without lowering display quality.

Means for Solving the Problem

To achieve the above object, a mobile phone terminal, an image display control method, an image display control program, and a program recording medium adopt characteristic configurations as below.

(1) A mobile phone terminal for displaying an image on a liquid-crystal display, including a reference luminance value table for beforehand registering luminance levels of a backlight of the liquid-crystal display as reference luminance values according to a gradation of image data to be displayed and a gamma correction value table for beforehand registering values to correct a drive level of a liquid-crystal panel of the liquid-crystal display as gamma correction values according to a gradation of image data to be displayed, wherein based on a gradation of image data inputted thereto, the luminance of the backlight is set to a luminance level corresponding to the reference luminance values registered to the reference luminance value table and a gamma correction is carried out on the basis of the gamma correction values registered to the gamma correction value table.

Advantages of the Invention

In accordance with a mobile phone terminal, an image display control method, an image display control program, and a program recording medium of the present invention, there can be attained the following advantages.

A first advantage resides in that by conducting the backlight luminance value control and the LCD gamma characteristic control according to an image to be displayed, the consumed power can be lowered without deteriorating display quality.

In a second advantage, backlight luminance setting control is possible in response to each of the user's setting to an arbitrary luminance level, the setting to individual luminance levels respectively corresponding to used scenes (a mail transmission and reception scene, a browsing scene, a photographing scene using a camera, a television scene, a game scene, etc.), and the setting to a luminance level corresponding to an external light level based on a detection result of an illuminance sensor.

According to a third advantage, the reference luminance value and the gamma correction value to be set for each display gradation can be determined by performing an arithmetic operation of the user's setting value, the setting value based on the used scene, and the setting value associated with the illuminance and representative values; hence, it is not required to prepare a plurality of tables to which the reference values and the gamma correction values are to be registered for each display gradation, as the user's setting values, the setting values based on the used scenes, and the setting values for respective illuminance values; therefore, the area to store the tables can be reduced.

BEST MODE FOR CARRYING OUT THE INVENTION

Next, by referring to accompanying drawings, description will be given of favorable embodiments of a mobile phone terminal, an image display control method, an image display control program, and a program recording medium in accordance with the present invention. Incidentally, it is natural that the present invention includes a program to make a computer execute processing, which will be described later, and a recording medium having stored the program.

Features of the Present Invention

Before the explanation of exemplary embodiments of the present invention, an outline of features of the present invention will be first described. The present invention relates to a display function of a mobile phone terminal in which for the setting value of the backlight luminance which is employed as a reference, by performing the backlight luminance value control and the LCD gamma characteristic control according to an image to be displayed, the consumed power can be lowered without reducing display quality.

That is, the present invention includes a reference luminance value table to which backlight luminance levels corresponding to a gradation characteristic of image data to be displayed on a screen are beforehand registered as reference luminance values and a backlight luminance setting value table to which drive signals to set the reference luminance values to the backlight are beforehand registered as luminance setting values; a backlight reference luminance value is attained by referring to the reference luminance value table according to a gradation of image data inputted thereto; by referring to the backlight luminance setting value table based on the obtained backlight reference luminance value, a signal level (pulse width for a PWM drive signal) of the drive signal to drive the backlight is obtained, to thereby turn the backlight on with the backlight luminance level in an appropriate state corresponding to the display image.

Additionally, there is arranged a gamma correction value table to which gamma correction values to correct the drive level to drive the liquid-crystal panel of the Liquid-Crystal Display (LCD) according to the gradation characteristic of image data to be displayed on the screen are registered; by controlling, according to the gradation characteristic of image data inputted thereto, the gamma characteristic of the liquid-crystal screen on which the image is to be displayed, it is possible to drive the display device (LCD) to retain high quality in hue of the display image.

Further, the present invention enables the reference luminance values (backlight luminance values) registered to the reference luminance table to be set and to be registered to different values for each of the used scenes (for example, a mail transmission and reception scene, a browsing scene to access the internet, a photographing scene to shoot an image using a camera, a television scene to display television video, a game scene to display game video, etc.) to be displayed on the screen; moreover, according to addition and deletion of an application executable by a mobile phone terminal, the used scenes may also be added or changed at any one time. In addition, the respective setting values registered to the reference luminance value table, the backlight luminance setting value table, and the gamma correction value table may be arbitrarily set to be changed. Further, in an operation to output a backlight luminance setting value by referring to the reference luminance value table as well as in an operation to output a gamma correction value by referring to the gamma correction value table, backlight luminance setting value and the gamma correction value may also be corrected on the basis of a result attained by detecting the environment (external light) in the periphery of the mobile phone terminal by an illumination sensor.

Configuration of Exemplary Embodiment

Figure 1:
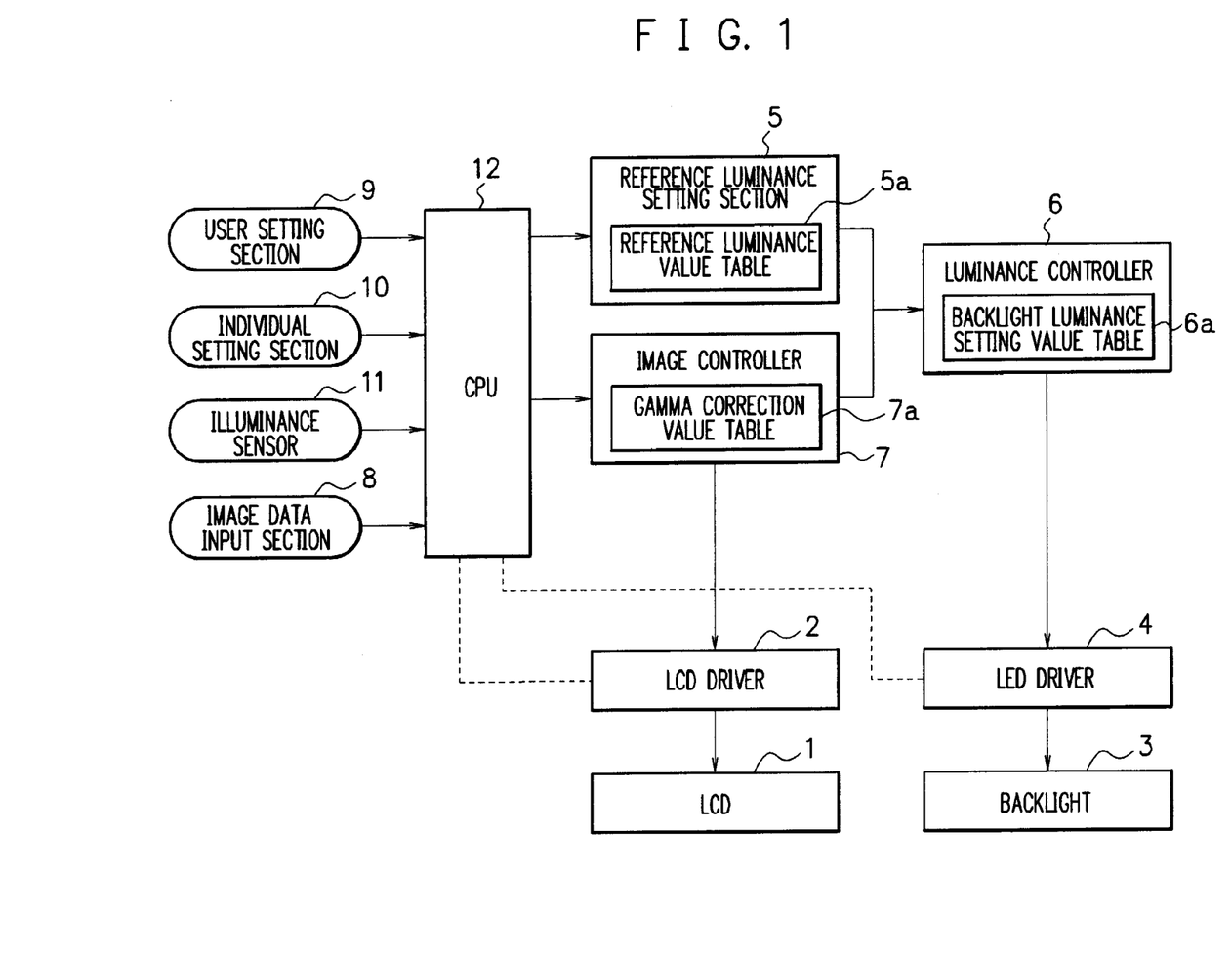
FIG. 1 is a block diagram showing an example of a block layout of a mobile phone terminal of the present invention.

FIG. 1 is a block layout diagram showing an example of a block layout of a mobile phone terminal in accordance with the present invention in which only circuit blocks supporting display functions are extracted to be displayed, omitting circuit blocks supporting a wireless communication function. A display function section of the mobile phone terminal representing an example of the present invention shown in FIG. 1 is constructed by including at least an LCD 1, an LCD driver 2, a backlight 3, an LED driver 4, a reference luminance setting section 5, a luminance control section 6, an image control section 7, an image data input section 8, a user setting section 9, an individual setting section 10, an illumination sensor 11, and a CPU 12.

The LCD 1 is a display device to display an image on a screen, and the LCD driver 2 drives the LCD 1 to display an image on a screen. Also, the backlight 3 is a light emitting device which is placed on a rear surface of the LCD 1 and which includes an LED to emit backlight and the LED driver 4 drives the LED of the backlight 3.

The reference luminance setting section 5 is a control section to calculate and to set a reference luminance value of the backlight 3 according to image data inputted via the CPU 12, and the luminance control section 6 is a controller to supervise luminance of the backlight 3 according to an indication from the reference luminance setting section 5. Additionally, the image control section 7 is a controller to control a display image to be displayed on the screen of the LCD 1 according to image data inputted via the CPU 12 thereto. Also, the CPU 12 is a control module to supervise the overall operation of the mobile phone terminal.

The image data input section 8 is an input module which receives image data to be presented on the screen of the LCD 1 to deliver the data to the CPU 12. Moreover, the user setting section 9 is an input unit to feed values specified by the user to the CPU 12 to set a control value of the image data and a luminance value of the backlight 3 to display an image on the screen of the LCD 1, and the individual setting section 10 is an input section to deliver a scene type individually specified for each used scene to the CPU 12 to indicate setting of a luminance value of the backlight 3 according to the used scene (a mail transmission and reception scene, a browsing scene, or the like). The illumination sensor 11 is a sensor which detects external light incident to the mobile phone terminal from its periphery to input it to the CPU 12. Here, in the user setting section 9 and the individual setting section 10, the control value of image data and the luminance value of the backlight which are beforehand registered to the mobile phone terminal may also be changed, added, or deleted according to user's taste or a used application (scene).

In this regard, the reference luminance setting section 5, the luminance control section 6, and the image control section 7 may be configured to be respectively independent of each other as shown in FIG. 1; however, it is also possible that these components are included in either one of the CPU 12, the LED driver 4, and the LCD driver 2 performing the overall control of the mobile phone terminal. Further, for the reference luminance setting section 5, the luminance control section 6, and the image control section 7, one or a plurality of functions may be implemented as a program or programs.

Similarly, the image data input section 8, the user setting section 9, and the individual setting section 10 may be configured to be respectively independent of each other as shown in FIG. 1, but may also be configured in one input module or may be configured in the CPU 12.

The reference luminance setting section 5 is provided with a reference luminance value table 5*a* to which backlight luminance values corresponding to the gradation characteristic of image data to be displayed on the screen are beforehand registered as reference luminance values; according to a gradation of image data inputted from the image data input section 8, a reference luminance value of the backlight 3 corresponding to the image data gradation is obtained by referring to the reference luminance value table 5*a* to be delivered to the luminance controller 6.

The reference luminance value table 5*a* is configured so that the reference luminance value of the backlight 3 is set to and is registered to a different value for each used scene (a mail transmission and reception scene, a browsing scene, a photographing scene using a camera, a television scene, or a game scene) displayed on the screen, and may be added or changed at any point of time, in response to addition or deletion of an application executable by the mobile phone terminal, by inputting a reference luminance value of the backlight for each used scene associated therewith. Alternatively, the reference luminance values of the backlight in the reference luminance value table 5*a* may also be arbitrarily set to be changed to a value desired by the user by use of the user setting section 9.

In addition, when outputting the reference luminance value of the backlight 3 by referring to the reference luminance value table 5*a*, the reference luminance setting section 5 may further correct the reference luminance value of the backlight 3 obtained by referring to the reference luminance value table 5*a* on the basis of a detection result of an environment of the periphery of the mobile phone terminal (external light) detected by the illumination sensor 11 to deliver the corrected value to the luminance controller 6. Incidentally, it is also possible that the side of the reference luminance setting section 5 directly outputs the reference luminance value of the backlight 3 obtained by referring to the reference luminance value table 5*a* without performing the correction based on the result of the detection by the illuminance sensor 11, and the side of the luminance controller 6 having received the reference luminance value of the backlight 3 conducts the correction based on the result of the detection by the illuminance sensor 11.

Moreover, the luminance controller 6 is provided with a backlight luminance setting value table 6*a* to which signal levels (pulse widths for PWM control) of the drive signal to set a reference value of the backlight 3 inputted from the reference luminance setting section 5 to the backlight 3 are beforehand set as luminance setting values of the backlight 3; by referring to the backlight luminance setting value table 6*a* based on the reference value of the backlight 3 inputted from the reference luminance setting section 5, a signal level of the drive signal to drive the backlight 3 is obtained to be outputted to the LED driver 4 to perform control such that the backlight 3 is turned on with the luminance level thereof in an appropriate state corresponding to the display image. In this regard, also the signal level of the drive signal of the backlight luminance setting value table 6*a* may be arbitrarily set to be changed to a desired value of the user from the user setting section 9 depending on cases.

Further, when outputting the signal level of the drive signal to drive the backlight 3 by referring to the backlight luminance setting value table 6*a*, the luminance controller 6 may further correct the signal level of the drive signal obtained by referring to the backlight luminance setting value table 6*a* on the basis of a detection result of an environment of the periphery of the mobile phone terminal (external light) detected by the illumination sensor 11 to feed the corrected value to the LED driver 4. Or, it is also possible that after correcting the reference luminance value of the backlight 3 from the reference luminance setting section 5 based on the result of the detection by the illuminance sensor 11, the luminance controller 6 may refer to the backlight luminance setting value table 6*a* to obtain the signal level of the drive signal to drive the backlight 3.

Also, the image control section 7 is provided with a gamma correction value table 7*a* to which a correspondence between the gradation characteristic of image data to be displayed on the screen and the values to correct the drive levels to drive the liquid-crystal panel of the LCD 1 is beforehand registered as gamma correction values; control is performed to display an original image with a correct hue on the screen of the LCD 1 according to a nonlinear voltage-transmittivity characteristic of the liquid-crystal panel.

That is, according to the gradation of the image data inputted from the image data input section 8, the gamma correction value table 7*a* is referred to so as to attain the gamma correction value to control the gamma characteristic of the liquid-crystal screen to display an image; resultantly, the drive signal for the LCD driver 2 to drive the LCD 1 is controlled to retain the hue of the display image at high quality. It is also possible that the gamma correction values of the gamma correction value table 7*a* are set to be changed to desired values of the user from the user setting section 9. Moreover, it is also possible that the gamma correction values of the gamma correction value table 7*a* are corrected according to the detection result of the illuminance sensor 11 which detects external light incident to the mobile phone terminal.

Description of Operation of Exemplary Embodiment

As a procedure up to when an image is displayed on the screen of the LCD 1 of the mobile phone terminal of FIG. 1 as an example of the present invention, description will be sequentially given of a flow from the setting of the luminance level of the backlight 3 and the input of image data, through the setting of the reference luminance value, the image control, and the luminance control, to the setting of luminance of the backlight 3 and the screen display onto the LCD 1.

The luminance level of the backlight 3 is set by use of one or a plurality of setting procedures including the setting by the user from the user setting section 9, the individual setting from the individual setting section 10 according to a used scene (e.g., a mail transmission and reception scene, a browsing scene, a photographing scene using a camera, or the like) in which the mobile phone terminal is used, and the automatic setting by detecting illuminance of external light by the illuminance sensor 11.

That is, it is possible that the user sets, by inputting from the user setting section 9, the luminance level of the backlight 3 according to the taste of the user to a luminance value manually and arbitrarily selected in association with the gradation level of the display image. In this connection, standard setting values are beforehand set as default values to the reference luminance table 5*a* and the backlight luminance setting value table 6*a*; the user may also issue from the user setting section 9 an indication of a change in the registered contents of the reference luminance table 5*a* and the backlight luminance setting value table 6*a*.

In addition, luminance levels of the backlight 3 are beforehand registered to the reference luminance table 5a and the backlight luminance setting value table 6a in association with the gradation levels of the display images for each of the used scene of, for example, a menu screen, a mail screen, a browsing screen, a camera screen, and the like; it is possible that the individual setting by the used scene is automatically set, each time a used scene is inputted from the individual setting section 10, to a luminance level corresponding to the pertinent used scene.

Moreover, in the automatic setting by the illuminance sensor 11, in accordance with an output from the illuminance sensor 11 according to brightness of the peripheral environment, the luminance level of the backlight 3 is automatically calculated and the backlight 3 is set to the calculated luminance level. Further, the luminance level produced on the basis of the reference luminance table 5a and the backlight luminance setting value table 6a may be automatically corrected according to the output from the illuminance sensor 11.

Further, the user may arbitrarily set to change, to a desired value of the user, the gamma correction value employed to correct the voltage-transmittivity characteristic of the LCD 1 according to the gradation of the display image. That is, it is possible for the user to set and to change any gamma correction value of the gamma correction value table 7a to an arbitrary value from the user setting section 9. Moreover, also depending on the detection result of external light from the illumination sensor 11, the user may further correct the gamma correction value of the gamma correction value table 7a.

After the operation above, when image data is inputted from the image data input section 8, the CPU 12 passes the image data to each of the reference luminance setting section 5 and the image control section 7. In the reference luminance setting section 5, one or a plurality of the setting values including the backlight luminance setting value by the user setting section 9, the backlight luminance setting value by the individual setting section 10, and the automatic setting by the illuminance sensor 11 is or are selected, and according to the gradation of the inputted image data, a reference luminance value of the backlight 3 set to the reference luminance value table 5a is read out; if the correction due to external light detected by the illuminance sensor 11 is required, the correction is carried out according to intensity of the external light, and a result of the correction is fed to the luminance controller 6.

The luminance controller 6 refers to the backlight luminance setting value table 6a based on the reference luminance value from the reference luminance value setting section 5 to obtain a signal level (a pulse width for the PWM signal) of the drive signal to drive the backlight 3 and outputs the signal level to the LED driver 4; accordingly, the LED driver 4 drives the LED of the backlight 3. As a result, the backlight 3 can be set to a luminance level corresponding to the gradation of the display image in association with the user's taste, the used scene, and the peripheral environment.

On the other hand, for the inputted image data, a gamma correction value for the gradation characteristic of the image data set in advance is attained from the gamma correction value table 7a, the drive level of the liquid-crystal panel is corrected by the gamma correction value conforming to the luminance level of the backlight 3 and the gradation of the image data such that the image data is optimized to have high visibility as a display image and is displayed on the screen of the LCD 1 driven by the LCD driver 2.

By performing the display control as above, the luminance level of the backlight 3 as a reference is set to an optimal state according to the gradation of the display image, and the gamma correction control is carried out for the image data; hence, the consumed power can be reduced without lowering display image quality. Additionally, it is possible that the luminance level of the backlight 3 is set to an appropriate state according to the user's taste and the used scene and is corrected according to the peripheral environment of the mobile phone terminal; it is hence possible to provide the user of the mobile phone terminal with a highly visible image with low consumed power.

Another Exemplary Embodiment

In conjunction with the exemplary embodiment described above, description has been given of an example in which according to the gradation of an image data to be displayed, the luminance level of the backlight 3 of the liquid-crystal display is beforehand registered to be set as a reference luminance value to the reference luminance value table 5a by the reference luminance setting section 5, and in accordance with the gradation of an image data to be displayed, the value to correct the drive level of the liquid-crystal panel is beforehand registered to be set as a gamma correction value to the gamma correction value table 7a by the image control section 7. Description has also been given of an example in which for the reference luminance value, the signal level of the drive signal to drive the backlight 3 is set and is registered as a luminance setting value to the backlight luminance setting value table 6a by the luminance control section 6.

There has been shown an example in which the reference luminance value table 5a to register the reference luminance values, the gamma correction value table 7a to register the gamma correction values, and the backlight luminance setting value table 6a to register the luminance setting values are optimized by arranging mutually different setting tables for the respective setting of the user setting values arbitrarily set by the user, the setting values based on used scenes to be set for respective used scenes where the mobile phone terminal is employed, and the setting values by illuminance corresponding to the detection value of the illuminance sensor to detect external light incident to the mobile phone terminal.

Figure 2:
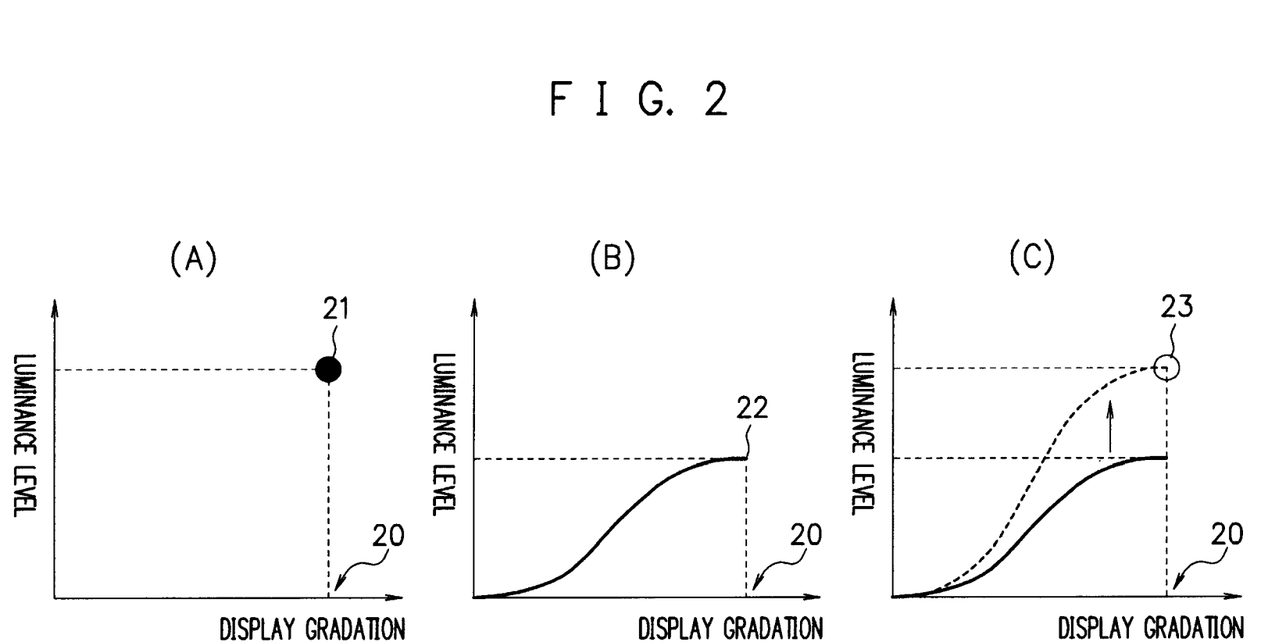
FIG. 2 is a schematic diagram to explain another operation different from the above exemplary embodiment in a reference luminance setting section of a mobile phone terminal of the present invention.

In contrast thereto, for the present embodiment, description has been given of an example in which for the reference luminance value table 5a, the gamma correction value table 7a, and the backlight luminance setting value table 6a, there is prepared at least one representative table representing each thereof; the user setting value, the setting value by used scene, and the setting value by illuminance are calculated according to a result of an arithmetic operation with respect to the representative table and are then respectively set to the table. For example, description will be next given of an example of the setting of the reference luminance value by referring to FIG. 2. FIG. 2 is a schematic diagram for explaining a second operation different from that of the above exemplary embodiment in the reference luminance setting section 5 of the mobile phone terminal in accordance with the present invention.

FIG. 2(A) shows a state in which a luminance level (input luminance value 21) for a specified gradation 20 is inputted, FIG. 2(B) shows a state in which the reference luminance value table 5a to which a representative luminance value 22 is registered in advance is referred to, and FIG. 2(B) shows a state in which a reference luminance value (setting reference luminance value 23) is set on the basis of a result of an arithmetic operation of the inputted input luminance value 21 and the representative luminance value 22. Here, as the input luminance value 21, either one of the reference luminance value inputted by the user from the user setting section 9, the reference luminance value set for each used scene by the individual setting section 10, and the reference luminance value set according to the detected illuminance sensed by the illuminance sensor 11 is delivered to the CPU 12 to be thereafter inputted from the CPU 12 to the reference luminance setting section 5.

As FIG. 2 shows, in the reference luminance setting section 5 of the present embodiment, when the input luminance value 21 for the display gradation 20 is inputted from the CPU 12 (step S1), the representative luminance value 22 for the specified display gradation 20 is referred to in the reference luminance value table 5a to which representative luminance values are beforehand registered as a representative table (step S2); arithmetic processing is executed between the input luminance value 21 for the specified display gradation 20 and the representative luminance value 22; based on a result of the arithmetic processing, the representative luminance value of each display gradation in the reference luminance value table 5a is corrected and then the reference luminance value is set as shown in FIG. 2(C) (step S3).

That is, there is conducted an operation in which arithmetic processing is executed between the externally designated input luminance value 21 and the registered data, beforehand registered as the reference luminance value 22, of the reference luminance value table 5a corresponding to the luminance level of the backlight 3 of the liquid-crystal display associated with the image data display gradation, to set a resultant value as the reference luminance value. Incidentally, the arithmetic processing between the input luminance value 21 and the registered data of the reference luminance value table 5a may be arithmetic processing wherein it is only necessary to execute arithmetic processing in which a ratio of the reference luminance value 22 for the display gradation 20 corresponding to the input luminance value 21 is calculated to be simply multiplied by the representative luminance value for each display gradation of the reference luminance value table 5a, to thereby calculate the reference luminance value to be set; but may also be arithmetic processing in which for the input luminance value, the representative value for each display gradation of the reference luminance value table 5a is weighted in a certain way.

Based on the result of the reference luminance value setting, the luminance controller 6 refers to the backlight luminance setting value table 6a to acquire a signal level of the drive signal to drive the backlight 3 and feeds the signal level to the LED driver 4, to thereby drive the LED of the backlight 3 by the LED driver 4. As a result, the backlight 3 can be set to a luminance level corresponding to the display image gradation in association with the user's taste, the used scene, and the peripheral environment.

That is, as the reference luminance value table 5a, it is not required to dispose a table for each setting associated with the user setting value, the setting value for each used scene, and the setting value due to the detection result of the illuminance sensor 11; by preparing at least one representative table for representative luminance values and by executing arithmetic processing between a representative luminance value registered to the luminance value representative table and the input luminance value 21 specified by either one of the user setting value, the setting value for each used scene, and the setting value due to the detection result of the illuminance sensor 11, it is possible to set the backlight 3 to the optimal luminance level according to the display image gradation. Resultantly, the present invention leads to an advantage in which it is only required to prepare at least only the representative reference luminance value table 5a, which reduces the storage area required to store the reference luminance value table.

In conjunction with FIG. 2, description has been given of an example of the reference luminance value table 5a to which reference luminance values are registered; however, also for the gamma correction value table 7a to which gamma correction values are registered or, in some cases, for the backlight luminance setting value table 6a to which signal levels of the drive signal to drive the backlight 3 are registered as luminance setting values, the situation is completely similar; for each thereof, it is also possible that at least one representative table is prepared as a representative thereof.

As described above, the present embodiment leads to advantages as below.

The first advantage resides in that by performing the backlight luminance control and the LCD gamma characteristic control according to an image to be displayed, the consumed power can be reduced without deteriorating display quality.

According to the second advantage, the backlight luminance setting control can be carried out correspondingly to each of the setting by the user to an arbitrary luminance level, the setting to the individual luminance level corresponding to each of the used scenes (the mail transmission and reception scene, the browsing scene, the photographing scene using a camera, and the like), or the setting to a luminance level in association with an external light level due to the detection result of the illuminance sensor 11.

In accordance with the third advantage, by conducting an arithmetic operation between the user's setting value, the setting value based on the used scene, and the setting value associated with the illuminance and the representative value, it is possible to attain the reference luminance value and the gamma correction value to be set for each display gradation; hence, it is not required to prepare a plurality of tables to which reference luminance values and gamma correction values are registered, as the user's setting values, the setting values for respective used scene, and the setting values for respective illuminance; hence, the area to store the tables can be reduced.

That is, in each exemplary embodiment, according to the display image gradation, image data to be displayed on the screen is corrected and the luminance level of the backlight 3 is also corrected; hence, the consumed power of the backlight can be advantageously optimized. Further, the luminance setting of the backlight 3 can also be accomplished by using one of or a combination of the user's setting, the individual setting for each used scene, and the automatic setting based on the external light. Additionally, in each exemplary embodiment, for arbitrary display contents and regardless of the mobile picture or the still picture, the luminance level of the backlight 3 is corrected according to the image data, and the image correction for the LCD 1 is also carried out at the same time; hence, the consumed power can be lowered while retaining display quality.

As above, description has been given of configurations of favorable embodiments of the present invention. However, it is to be appreciated that these exemplary embodiments only exemplify the present invention and do not restrict the present invention at all. It will be easily understood by those of ordinary skill in the art that various changes may be made therein according to particular uses without departing from the spirit and scope of the present invention. For example, the exemplary embodiments of the present invention can be represented in the following configurations in addition to the configuration (1) of the means to solve the problems.

(2) A mobile phone terminal described in (1) above, including a backlight luminance setting value table for beforehand registering, corresponding to the reference luminance values registered to the reference luminance value table, signal levels of a drive signal to drive the backlight of the liquid-crystal display as luminance setting values, wherein a signal level of the drive signal corresponding to the reference luminance value selected on the basis of the gradation of the inputted image data is acquired by referring to the backlight luminance setting value table.

(3) A mobile phone terminal described in (2) above, wherein the drive signal to drive the backlight of the liquid-crystal display is a PWM signal.

(4) A mobile phone terminal described either one of (1) to (3) above, including user setting means which enables a user to change and to set to an arbitrary value, the reference luminance values registered to the reference luminance value table and/or the gamma correction values registered to the gamma correction value table and/or the luminance setting values registered to the backlight luminance setting value table.

(5) A mobile phone terminal described in one of (1) to (4), including individual setting means which individually comprises, for each used scene employed for the mobile phone terminal, the reference luminance values registered to the reference luminance value table and/or the luminance setting values registered to the backlight luminance setting value table and which automatically inputs a current used scene of the mobile phone terminal to select the reference luminance value and/or the luminance setting value corresponding to the used scene to be currently employed, from the reference luminance values registered to the reference luminance value table and/or the luminance setting values registered to the backlight luminance setting value table.

(6) A mobile phone terminal described in (5) above, wherein the used scene comprises at least either one of a mail transmission and reception scene to communicate an electronic mail, a browsing scene to access an internet, a photographing scene to shoot an image by a camera, a television scene to display television video, and a game scene to display video for a game.

(7) A mobile phone terminal described in one of (1) to (6) above, including an illuminance sensor to detect external light incident to the mobile phone terminal, wherein the reference luminance value obtained from the reference luminance value table and/or the gamma correction value attained from the gamma correction value table and/or the luminance setting value acquired from the backlight luminance setting value table on the basis of the gradation of the image to be displayed is/are corrected according to a detection result detected by the illuminance sensor.

(8) A mobile phone terminal described in one of (1) to (7) above, including, as the reference luminance value table, at least one luminance value representative table to which representative reference luminance values are registered, wherein a reference luminance value to be set is calculated on the basis of an arithmetic operation result of an input luminance value inputted as a luminance level for a specified display gradation and a reference luminance value in the luminance value representative table.

(9) A mobile phone terminal described in one of (1) to (8) above, including at least one correction value representative table to which representative gamma correction values are registered, as the gamma correction value table, wherein a gamma correction value to be set is calculated on the basis of an arithmetic operation result of an input correction value inputted as a gamma correction level for a specified display gradation and a gamma correction value in the correction value representative table.

(10) An image display control method for use with a mobile phone terminal for displaying an image on a liquid-crystal display, including a reference luminance value table for beforehand registering, according to a gradation of image data to be displayed, luminance levels of a backlight of the liquid-crystal display as reference luminance values and a gamma correction value table for beforehand registering values to correct a drive level of a liquid-crystal panel of the liquid-crystal display as gamma correction values, wherein based on a gradation of image data inputted thereto, the luminance of the backlight is set to a luminance level corresponding to the reference luminance values registered to the reference luminance value table and a gamma correction is carried out on the basis of the gamma correction values registered to the gamma correction value table.

(11) An image display control method described in (10) above, including a backlight luminance setting value table for beforehand registering, corresponding to the reference luminance values registered to the reference luminance value table, signal levels of a drive signal to drive the backlight of the liquid-crystal display as luminance setting values, wherein a signal level of the drive signal corresponding to the reference luminance value selected on the basis of the gradation of the inputted image data is acquired by referring to the backlight luminance setting value table.

(12) An image display control method described in (10) or (11) above, wherein a user is capable of changing and setting to an arbitrary value, the reference luminance values registered to the reference luminance value table and/or the gamma correction values registered to the gamma correction value table and/or the luminance setting values registered to the backlight luminance setting value table.

(13) An image display control method described in one of (10) to (12) above, individually including, for each used scene employed for the mobile phone terminal, the reference luminance values registered to the reference luminance value table and/or the luminance setting values registered to the backlight luminance setting value table, and a current used scene of the mobile phone terminal is automatically inputted to select the reference luminance value and/or the luminance setting value corresponding to the used scene to be currently employed, from the reference luminance values registered to the reference luminance value table and/or the luminance setting values registered to the backlight luminance setting value table.

(14) An image display control method described in (13) above, wherein the used scene comprises at least either one of a mail transmission and reception scene to communicate an electronic mail, a browsing scene to access an internet, a photographing scene to shoot an image by a camera, a television scene to display television video, and a game scene to display video for a game.

(15) An image display control method described in one of (10) to (14) above, wherein the reference luminance value obtained from the reference luminance value table and/or the gamma correction value attained from the gamma correction value table and/or the luminance setting value acquired from the backlight luminance setting value table on the basis of the gradation of the image to be displayed is/are corrected according to a detection result of external light incident to the mobile phone terminal.

(16) An image display control method described in one of (10) to (15) above, including, as the reference luminance value table, at least one luminance value representative table to which representative reference luminance values are registered, wherein a reference luminance value to be set is calculated on the basis of an arithmetic operation result of an input luminance value inputted as a luminance level for a specified display gradation and a reference luminance value in the luminance value representative table.

(17) An image display control method described in one of (10) to (16) above, including at least one correction value representative table to which representative gamma correction values are registered, as the gamma correction value table, wherein a gamma correction value to be set is calculated on the basis of an arithmetic operation result of an input correction value inputted as a gamma correction level for a specified display gradation and a gamma correction value in the correction value representative table.

(18) An image display control program implementing as a computer executable program, an image display control method described in one of (10) to (17) above.

(19) A program recording medium having recorded therein an image display control program described in (18) above in a computer readable recording medium.

This application is the National Phase of PCT/JP2008/055479 filed on Mar. 25, 2008, which is based upon and claims the benefit of priority from Japanese patent applications No. 2007-078271, filed on Mar. 26, 2007 and No. 2007-276133, filed on Oct. 24, 2007, the disclosure of which are incorporated herein in those entirety by reference.

DESCRIPTION OF REFERENCE NUMERALS

1 LCD
2 LCD driver
3 Backlight
4 LED driver
5 Reference luminance setting section
5a Reference luminance value table
6 Luminance control section
6a Backlight luminance setting value table
7 Image control section
7a Gamma correction value table
8 Image data input section
9 User setting section
10 Individual setting section
11 Illuminance sensor
12 CPU
20 Display gradation
21 Input luminance value
22 Representative luminance value
23 Setting reference luminance value

The invention claimed is:

1. A mobile phone terminal for displaying an image on a liquid-crystal display, comprising:
a reference luminance setting section including a reference luminance value table; and
an image control section including a gamma correction value table,
wherein the reference luminance value table for beforehand register luminance levels of a backlight of the liquid-crystal display as reference luminance values according to a gradation of image data to be displayed;
the gamma correction value table for beforehand register values to correct a drive level of a liquid-crystal panel of the liquid-crystal display as gamma correction values according to a gradation of image data to be displayed;
the reference luminance setting section sets the luminance of the backlight to a luminance level corresponding to the reference luminance values registered to the reference luminance value table based on a gradation of image data inputted thereto; and
the image control section carrier out a gamma correction on the basis of the gamma correction values registered to the gamma correction value table.

2. The mobile phone terminal in accordance with claim 1, characterized by comprising a backlight luminance setting value table for beforehand registering, corresponding to the reference luminance values registered to the reference luminance value table, signal levels of a drive signal to drive the backlight of the liquid-crystal display as luminance setting values, wherein a signal level of the drive signal corresponding to the reference luminance value selected on the basis of the gradation of the inputted image data is acquired by referring to the backlight luminance setting value table.

3. The mobile phone terminal in accordance with claim 2, characterized in that the drive signal to drive the backlight of the liquid-crystal display is a PWM signal.

4. The mobile phone terminal in accordance with claim 1, characterized by comprising a user setting unit which enables a user to change and to set to an arbitrary value, the reference luminance values registered to the reference luminance value table and/or the gamma correction values registered to the gamma correction value table and/or the luminance setting values registered to the backlight luminance setting value table.

5. The mobile phone terminal in accordance with claim 1, characterized by comprising an individual setting unit which individually comprises, for each used scene employed for the mobile phone terminal, the reference luminance values registered to the reference luminance value table and/or the luminance setting values registered to the backlight luminance setting value table and which automatically inputs a current used scene of the mobile phone terminal to select the reference luminance value and/or the luminance setting value corresponding to the used scene to be currently employed, from the reference luminance values registered to the reference luminance value table and/or the luminance setting values registered to the backlight luminance setting value table.

6. The mobile phone terminal in accordance with claim 5, characterized in that the used scene comprises at least either one of a mail transmission and reception scene to communicate an electronic mail, a browsing scene to access an internet, a photographing scene to shoot an image by a camera, a television scene to display television video, and a game scene to display video for a game.

7. The mobile phone terminal in accordance with claim 1, characterized by comprising an illuminance sensor to detect external light incident to the mobile phone terminal, wherein the reference luminance value obtained from the reference luminance value table and/or the gamma correction value attained from the gamma correction value table and/or the luminance setting value acquired from the backlight luminance setting value table on the basis of the gradation of the image to be displayed is/are corrected according to a detection result detected by the illuminance sensor.

8. The mobile phone terminal in accordance with claim 1, characterized by comprising, as the reference luminance value table, at least one luminance value representative table to which representative reference luminance values are registered, wherein a reference luminance value to be set is calculated on the basis of an arithmetic operation result of an input luminance value inputted as a luminance level for a specified display gradation and a reference luminance value in the luminance value representative table.

9. The mobile phone terminal in accordance with claim 1, characterized by comprising, at least one correction value representative table to which representative gamma correction values are registered, as the gamma correction value table, wherein a gamma correction value to be set is calculated on the basis of an arithmetic operation result of an input correction value inputted as a gamma correction level for a specified display gradation and a gamma correction value in the correction value representative table.

10. An image display control method for use with a mobile phone terminal for displaying an image on a liquid-crystal display, comprising:
   registering beforehand in a reference luminance value table luminance levels of a backlight of the liquid-crystal display as reference luminance values according to a gradation of image data to be displayed;
   registering beforehand in a gamma correction value table values to correct a drive level of a liquid-crystal panel of the liquid-crystal display as gamma correction values according to a gradation of image data to be displayed;
   setting the luminance of the backlight, based on a gradation of image data inputted thereto, to a luminance level corresponding to the reference luminance values registered to the reference luminance value table; and
   carrying out a gamma correction on the basis of the gamma correction values registered to the gamma correction value table.

11. The image display control method in accordance with claim 10, characterized by comprising a backlight luminance setting value table for beforehand registering, corresponding to the reference luminance values registered to the reference luminance value table, signal levels of a drive signal to drive the backlight of the liquid-crystal display as luminance setting values, wherein a signal level of the drive signal corresponding to the reference luminance value selected on the basis of the gradation of the inputted image data is acquired by referring to the backlight luminance setting value table.

12. The image display control method in accordance with claim 10, characterized in that a user is capable of changing and setting to an arbitrary value, the reference luminance values registered to the reference luminance value table and/or the gamma correction values registered to the gamma correction value table and/or the luminance setting values registered to the backlight luminance setting value table.

13. The image display control method in accordance with claim 10, characterized by individually comprising, for each used scene employed for the mobile phone terminal, the reference luminance values registered to the reference luminance value table and/or the luminance setting values registered to the backlight luminance setting value table, and a current used scene of the mobile phone terminal is automatically inputted to select the reference luminance value and/or the luminance setting value corresponding to the used scene to be currently employed, from the reference luminance values registered to the reference luminance value table and/or the luminance setting values registered to the backlight luminance setting value table.

14. The image display control method in accordance with claim 13, characterized in that the used scene comprises at least either one of a mail transmission and reception scene to communicate an electronic mail, a browsing scene to access an internet, a photographing scene to shoot an image by a camera, a television scene to display television video, and a game scene to display video for a game.

15. The image display control method in accordance with claim 10, characterized in that the reference luminance value obtained from the reference luminance value table and/or the gamma correction value attained from the gamma correction value table and/or the luminance setting value acquired from the backlight luminance setting value table on the basis of the gradation of the image to be displayed is/are corrected according to a detection result of external light incident to the mobile phone terminal.

16. The image display control method in accordance with claim 10, characterized by comprising, as the reference luminance value table, at least one luminance value representative table to which representative reference luminance values are registered, wherein a reference luminance value to be set is calculated on the basis of an arithmetic operation result of an input luminance value inputted as a luminance level for a specified display gradation and a reference luminance value in the luminance value representative table.

17. The image display control method in accordance with claim 10, characterized by comprising, at least one correction value representative table to which representative gamma correction values are registered, as the gamma correction value table, wherein a gamma correction value to be set is calculated on the basis of an arithmetic operation result of an input correction value inputted as a gamma correction level for a specified display gradation and a gamma correction value in the correction value representative table.

18. A program recording medium recording an image display control program, characterized by implementing as a computer executable program, an image display control method in accordance with claim 10.

* * * * *